May 13, 1930. T. J. KAUFMAN 1,758,226
WASTE VALVE FITTING
Filed Jan. 14, 1927
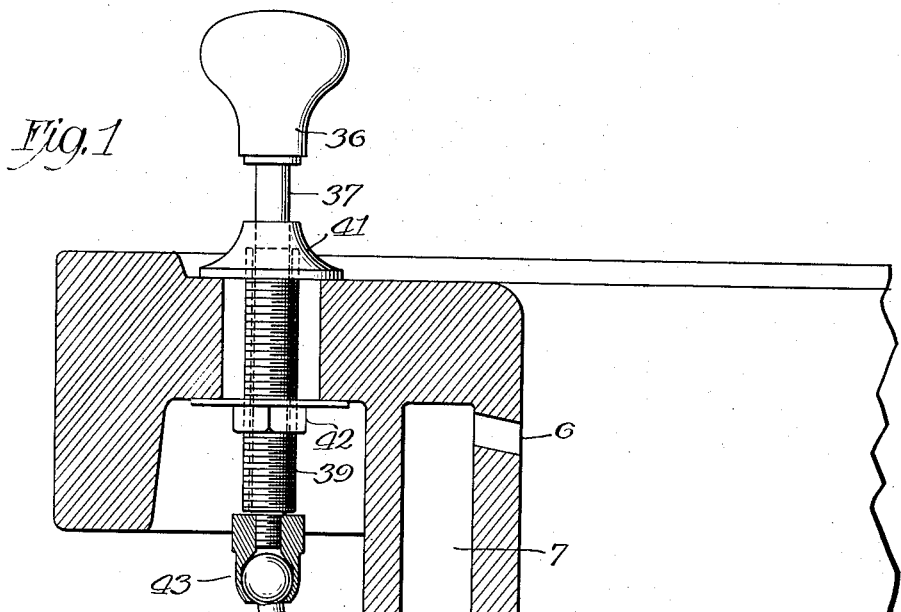
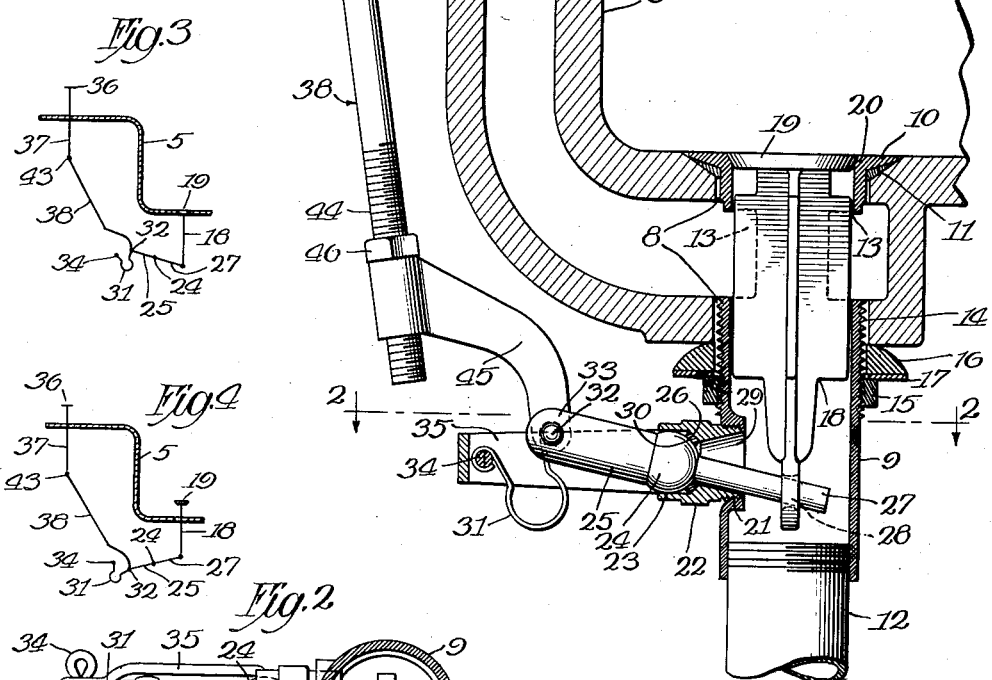
Inventor
Tobias J. Kaufman
By Gillson, Mann & Cox
Attys.

Patented May 13, 1930

1,758,226

UNITED STATES PATENT OFFICE

TOBIAS J. KAUFMAN, OF CHICAGO, ILLINOIS

WASTE-VALVE FITTING

Application filed January 14, 1927. Serial No. 161,116.

My invention relates to plumbing devices and more particularly to fittings and valve or waste plug operating mechanism for lavatories.

One of the objects of the invention is the provision of a new and improved waste plug operating mechanism in which a toggle having a spring as one of its members is employed.

Another object of the invention is the provision of a new and improved fitting for connecting the drain opening of a lavatory directly to the drain pipe.

A further object of the invention is the provision of new and improved fitting and waste plug operating mechanism that is cheap to manufacture, easily assembled, efficient in operation, composed of few moving parts and that is not likely to become broken or get out of order.

Other and further objects and advantages of the invention will appear from the following description taken in connection with the accompanying drawings in which:

Fig. 1 is a vertical section of a lavatory showing the invention in position thereon with parts broken away;

Fig. 2 is a section on line 2—2 of Fig. 1;

Fig. 3 is a diagrammatic view showing the valve or waste plug in closed position; and Fig. 4 is a similar view showing the valve or waste plug in open position.

Referring now to the drawings on which the similar reference characters designate the same parts throughout the description, the reference character 5 designates a basin, lavatory or other receptacle of any approved construction having an overflow opening 6, a passage 7, and a discharge or drain opening 8 through its bottom wall, as are usual in such devices.

It is common practice to provide a sectional fitting between the basin and the upper end of the drain pipe or tail piece. This has heretofore been deemed necessary because of the fact that the upper portion containing the valve is provided with an integral flange which necessitates the insertion of the fitting in the lavatory opening from the top. The making of this fitting in separate pieces and assembling the same from these pieces is objectionable because of the added cost of time and labor in the manufacture of the separate parts. This objection is overcome by providing a single simple tubular fitting 9 for this purpose.

The fitting 9 extends downwardly through the opening 8 and is flanged at its upper end as at 10 for compressing the packing 11 in the flared upper portion of the opening 8 for forming a water tight joint. The lower end of the fitting is detachably connected to the upper end of the drain pipe or tail piece 12 in any suitable manner. As shown, the tubular fitting 9 is internally threaded for engaging the threaded upper end of the pipe 12. The fitting 9 is provided with a plurality of openings 13 in its side wall in alinement with the passage 7 through which water may escape from said passage into said drain pipe or tail piece. Screw threads 14 are provided on the intermediate portion of the fitting 9 for receiving the clamping nut 15, for clamping the gasket 16 against the under side of the lavatory, for forming a water tight joint, between the fitting and the lavatory. A rigid annular member 17 may be inserted between the nut 15 and the gasket for more efficiently clamping said gasket. The lower end of the fitting below the threaded portion is slightly reduced whereby the nut 15 may be readily slipped over the same in assembling the device.

A waste plug or valve 18 of any suitable form is slidably mounted in the drain tubular fitting 9 and its head 19 is adapted to engage a seat 20 on said fitting, when the plug is in lowered position in the usual manner.

The means for operating the waste plug or valve 18 will now be described. It consists of a spring pressed toggle for holding the valve in either open or closed position. The fitting 9 is provided with an opening 21 through which the valve operating mechanism is adapted to extend. Suitable means are provided for supporting the valve operating mechanism. In the form of the device selected to illustrate one embodiment of the invention, a plug 22 having an axial bore 23 is employed for this purpose. The plug is secured in the opening 21 in any suitable manner as by being threaded therein. In order to firmly attach the plug 22 to the fitting 9 so that the operating mechanism will not cause the plug to become loosened or detached, the wall of the fitting 9 is enlarged as by providing a radially-extended portion or boss 210 through which the opening 21 extends. By means of this arrangement the threads are continuous about the opening for rigidly securing the plug in position. The outer end of the bore in the plug 22 is cylindrical for receiving the spherical end 24 of the toggle link 25. The plug 22 is provided with a conical shoulder 26 for limiting the inward movement of the member 24. A gasket 30 is preferably inserted between the shoulder 26 and the spherical member 24 for forming a water tight joint. The link 25 is provided with an extension 27 for engaging an opening 28 in the stem of the valve or waste plug 18 for raising and lowering the same. The inner end of the opening through the plug 22 is flared as shown at 29 to permit vertical movement of the extension 27. The other toggle link 31 is in the form of a leaf spring, preferably approximately U shaped, having its inner end bifurcated and connected to a pin 32 extending across the bifurcated end 33 of the link 25, see Fig. 2. The outer end of the spring 31 is connected to a pin 34 extending across the outer end of the U shaped support 35 which is rigidly connected to the plug 22 and extends outwardly therefrom.

Suitable means are provided for operating the toggle formed by the link 25 and the spring 31. When the device is used on a lavatory, as shown, a handle or knob 36 is provided for this purpose. The handle 36 is placed in a convenient position above the lavatory 5. It is connected to the toggle through the medium of the stem 37 and the link 38. The stem 37 passes through the sleeve or bushing 39, preferably threaded at each end for receiving flanged nut or head 41, and the clamp nut 42, for attaching said sleeve to said lavatory. The stem 37 is connected at its lower end by a ball and socket joint 43, with the link 38. The link 38 comprises the screw threaded rod 44 and arm 45. The arm 45 is pivotally connected to the pin 32 at its lower end, between the bifurcated ends of spring 31. It is adjustably connected to the rod 44 at its upper end as by being screw threaded thereon. A lock nut 46 holds the part in adjusted position.

In assembling the device, the arm 45 is so adjusted on the rod 38 that the lead spring 31 will be under initial tension, whereby the said spring will not only hold the spherical member 24 within the sleeve or cylindrical portion of the plug 22, but will also hold the valve stopper or plug 14 tightly on its seat, when the parts are in the position shown in Fig. 1. The spring 31 will also be under tension when the plug 14 is elevated so that the same will be held in inoperative position by the resiliency of the spring.

In the operation of the device, when it is desired to move the valve from the closed position shown in Figs. 1 and 3 to the open position as shown in Fig. 4, the handle 36 is pressed down, which will move the pin 32 below dead center and the expansive force of the spring 31 will snap the valve to elevated position and hold it there as shown in Fig. 4. On elevating the knob or handle 36, the toggle will move upwardly past dead center and the spring will snap the valve to closed position and will hold the same tightly on its seat, as shown in Figs. 1 and 3, to form a water-tight joint.

It is thought from the foregoing taken in connection with the accompanying drawings that the construction and operation of my device will be apparent to those skilled in the art, and that changes in size, shape, proportion and details of construction may be made without departing from the spirit and scope of the appended claims.

I claim as my invention:

1. In a plumbing system, a lavatory basin having a drain part, a fitting in said part forming a valve seat, and means for opening and closing said valve, said means comprising a pivoted actuating member forming one link of a toggle, a spring forming the other link of said toggle and a push rod engaging an intermediate portion of said toggle for operating the same.

2. In a plumbing device, a valve operating mechanism comprising a toggle, one link of which is rigid and is extended to form a valve operating member and the other link of which is a resilient member.

3. In a plumbing device, valve operating mechanism comprising a supporting member provided with an axial opening forming a socket at its outer end, a rigid link having a curved surface for engaging said socket, one end of said link extending beyond said supporting member for engaging a valve stem, an extension on said supporting member and a spring connected to said extension, and to the opposite end of said link for forming a toggle, and a push rod pivoted to said link and spring.

4. A valve operating mechanism for a lavatory comprising a screw threaded plug provided with an axial opening, a shoulder in said opening, a link extending through said plug, a spherical enlargement on said link for engaging in said opening against said shoulder, a valve operating extension on said link, a support rigidly connected to said plug, a leaf spring connected to said link and support, and a handle member pivoted to said link and spring for moving the same past dead center in either direction.

5. A one piece fitting for a lavatory comprising a tubular member having one end internally threaded to receive the adjacent end of a waste pipe and having its opposite end provided with a valve seat, said member having its intermediate portion screw threaded for receiving a clamping nut to clamp a gasket again said lavatory, a plug detachably secured in the wall of said member, and provided with an axial opening, a link extending through said opening and having an extension extending into said member, a leaf spring for forming a toggle with said link, and means for operating said toggle.

6. A one piece waste plug fitting comprising a tubular member having a radially extending flange on its upper end and threaded at its opposite end, a valve slidably mounted in said member, means for securing said fitting in operative position, an opening formed in the side wall of said one piece fitting, a lever concentrically mounted for pivotal universal movement in said opening and having its inner end extending through the opening and engaging said valve, said opening being enlarged to permit the universal action of the lever and means for operating said pivotal lever.

In testimony whereof I affix my signature.

TOBIAS J. KAUFMAN.